United States Patent
Morita

(10) Patent No.: US 10,247,810 B2
(45) Date of Patent: Apr. 2, 2019

(54) RADAR APPARATUS AND SIGNAL GENERATING APPARATUS

(71) Applicant: Panasonic Corporation, Osaka (JP)

(72) Inventor: Tadashi Morita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 498 days.

(21) Appl. No.: 15/043,763

(22) Filed: Feb. 15, 2016

(65) Prior Publication Data

US 2016/0259036 A1 Sep. 8, 2016

(30) Foreign Application Priority Data

Mar. 3, 2015 (JP) ................................. 2015-041235

(51) Int. Cl.
| | |
|---|---|
| *G01S 7/40* | (2006.01) |
| *G01S 7/282* | (2006.01) |
| *G01S 7/288* | (2006.01) |
| *G01S 13/10* | (2006.01) |
| *G01S 13/30* | (2006.01) |

(52) U.S. Cl.
CPC ............ *G01S 7/4004* (2013.01); *G01S 7/282* (2013.01); *G01S 7/288* (2013.01); *G01S 7/4021* (2013.01); *G01S 13/106* (2013.01); *G01S 13/30* (2013.01); *G01S 2007/2886* (2013.01)

(58) Field of Classification Search
CPC .......... G01S 7/40–7/4056; G01S 7/288; G01S 13/106; G01S 13/30; G01S 7/282; G01S 2007/2886

See application file for complete search history.

(56) References Cited

U.S. PATENT DOCUMENTS

| | | | | |
|---|---|---|---|---|
| 5,150,128 | A * | 9/1992 | Kongelbeck | G01R 25/00 342/102 |
| 5,369,411 | A * | 11/1994 | Lisle, Jr. | G01S 7/4021 342/151 |
| 6,204,803 | B1 | 3/2001 | Uehara | |
| 6,469,661 | B1 * | 10/2002 | Doerry | G01S 7/288 342/194 |
| 9,300,518 | B2 * | 3/2016 | Morita | H04L 27/3863 |
| 9,372,259 | B2 * | 6/2016 | Kishigami | G01S 7/2813 |
| 2016/0139247 | A1 * | 5/2016 | Kim | G01S 7/352 342/174 |

FOREIGN PATENT DOCUMENTS

| | | |
|---|---|---|
| JP | 2000-338230 | 12/2000 |
| JP | 2013-185945 A | 9/2013 |
| JP | 2014/020970 A | 2/2014 |

* cited by examiner

*Primary Examiner* — Matthew M Barker

(74) *Attorney, Agent, or Firm* — Seed IP Law Group LLP

(57) ABSTRACT

A radar apparatus includes a correlator which, in operation, calculates a correlation value between the digital transmission pulse signals and the digital reception pulse signals, an error estimator which, in operation, estimates, on the basis of the correlation value, an I component error and a Q component error included in the digital reception pulse signals, a correction parameter calculator which, in operation, calculates a correction parameter for correcting the I component error and the Q component error, and an error corrector which, in operation, corrects, on the basis of the correction parameter, the I component error and the Q component error included in at least one of the digital transmission pulse signals and the digital reception pulse signals.

5 Claims, 12 Drawing Sheets

RADAR APPARATUS AND SIGNAL GENERATING APPARATUS

BACKGROUND

1. Technical Field

The present disclosure relates to a radar apparatus that detects a target.

2. Description of the Related Art

A radar apparatus that is known in the related art radiates pulse signals toward an open space and receives a reflected wave signal reflected by a target (object) in order to measure, for example, a range and a direction to the target, thereby detecting the target. In such a radar apparatus of the related art, in a case in which a signal processed by a radio frequency (RF) unit includes an error in at least one of an in-phase component (I component) and a quadrature component (Q component), an error frequency component appears in a frequency domain with an inverted sign with respect to a frequency domain of a correct frequency component. This degrades performance of detecting Doppler estimation results.

As a solution to this problem, Japanese Unexamined Patent Application Publication No. 2000-338230 discloses a radar apparatus that prevents degradation of the performance of detecting Doppler estimation results by, in a case in which the signal processed by the RF unit includes at least one of an I component error and a Q component error, calculating a correct amount of frequency components from the amount of the correct frequency components and the amount of error frequency components.

However, in a case in which each of frequency domains with inverted signs includes correct frequency components of reflected wave signals reflected by different targets, it is unlikely to detect all targets with the technique disclosed in Japanese Unexamined Patent Application Publication No. 2000-338230.

SUMMARY

One non-limiting and exemplary embodiment provides a radar apparatus that can prevent degradation of sidelobe performance and degradation of the performance of detecting Doppler estimation results and that can detect all targets even in a case in which each of frequency domains with inverted signs includes correct frequency components of reflected wave signals reflected by different targets.

In one general aspect, the techniques disclosed here feature a radar apparatus including a pulse generator which, in operation, sequentially generates, in each transmission cycle, a digital transmission pulse signal including an in-phase (I) component and a quadrature (Q) component; a phase rotator which, in operation, sequentially applies, in each transmission cycle, a first phase rotation to the digital transmission pulse signal; a digital-to-analog converter (DAC) which, in operation, converts the digital transmission pulse signal, to which the first phase rotation is applied, to a transmission baseband analog signal; a transmitter which, in operation, converts the transmission baseband analog signal to a radar signal on a radio frequency and transmits the radar signal; a receiver which, in operation, receives a reflected wave signal resulting from the radar signal being reflected on an object and converts the reflected wave signal to a reception baseband analog signal; an analog-to-digital converter (ADC) which, in operation, converts the reception baseband analog signal to a digital reception pulse signals including an in-phase (I) component and a quadrature (Q) component; a correlator which, in operation, calculates a correlation value between the digital transmission pulse signals and the digital reception pulse signals; an error estimator which, in operation, estimates, on the basis of the correlation value, an I component error and a Q component error included in the digital reception pulse signals; a correction parameter calculator which, in operation, calculates a correction parameter for correcting the I component error and the Q component error; and an error corrector which, in operation, corrects, on the basis of the correction parameter, the I component error and the Q component error included in at least one of the digital transmission pulse signals and the digital reception pulse signals.

According to the radar apparatus in an embodiment of the present disclosure, it is possible to prevent degradation of the sidelobe performance and degradation of the performance of detecting Doppler estimation results and to detect all targets even in a case in which each of frequency domains with inverted signs includes correct frequency components of reflected wave signals reflected by different targets.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
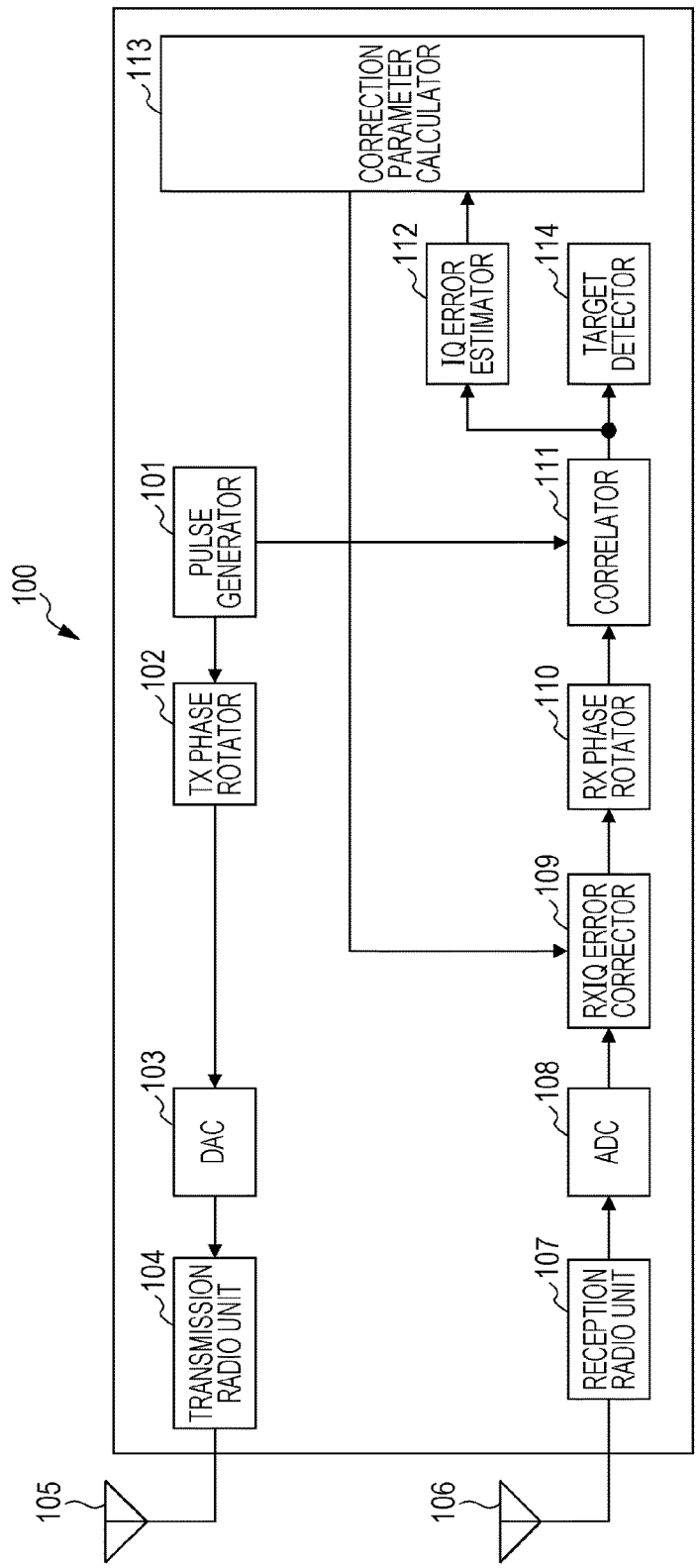
FIG. 1 is a block diagram illustrating a configuration of a radar apparatus according to a first embodiment of the present disclosure.

In an embodiment of the present disclosure, first, a radar apparatus is used in which each of a transmission signal processing system and a reception signal processing system in a radio frequency (RF) unit includes a phase rotator. In this radar apparatus, phase rotation is applied to pulse signals in a unit of a few pulses in the transmission signal processing system. In synchronization with this, phase rotation counter to the phase rotation applied by the transmission signal processing system is applied to a reflected wave signal in the reception signal processing system. Thus, it becomes possible to flatten and cancel an in-phase component (I component) error and a quadrature component (Q component) error that are generated in the RF unit during processing between the phase rotator in the transmission signal processing system and the phase rotator in the reception signal processing system. In addition, it becomes possible to realize sidelobe performance that is as high as that without RF errors. That is, the radar apparatus can produce an effect of preventing degradation of the sidelobe performance that has not been considered in Japanese Unexamined Patent Application Publication No. 2000-338230.

Next, the radar apparatus according to the embodiment of the present disclosure is more intensely studied because it has been needed to take measures against degradation of the performance of detecting Doppler estimation results. Otherwise, an error frequency component will appear in a frequency domain with an inverted sign with respect to a frequency domain of a correct frequency component when estimating a velocity component of a target (object) by performing fast Fourier transform (FFT) later on a received reflected wave signal to which a Doppler phase fluctuation component is added in a transmission path.

As a result, there has been made the radar apparatus according to the embodiment of the present disclosure that can prevent degradation of the sidelobe performance and degradation of the performance of detecting Doppler estimation results and can detect all targets even in a case in which each of frequency domains with inverted signs includes correct frequency components of reflected wave signals reflected by different targets.

Embodiments of the present disclosure will be described below in detail with reference to the drawings.

First Embodiment

Configuration of Radar Apparatus

A configuration of a radar apparatus 100 according to a first embodiment of the present disclosure will be described below in detail with reference to FIG. 1.

The radar apparatus 100 includes a pulse generator 101, a transmission (TX) phase rotator 102, a digital-to-analog converter (hereinafter referred to as a DAC) 103, a transmission radio unit 104, an antenna 105, an antenna 106, a reception radio unit 107, an analog-to-digital converter (hereinafter referred to as an ADC) 108, a reception in-phase and quadrature (RXIQ) error corrector 109, a reception (RX) phase rotator 110, a correlator 111, an in-phase and quadrature (IQ) error estimator 112, a correction parameter calculator 113, and a target detector 114. The pulse generator 101 and the TX phase rotator 102 constitute a signal generator.

The pulse generator 101 generates a pair of pulse signals including an I component signal and a Q component signal, from which a radar signal is to be made, in each transmission cycle. Hereinafter, the pulse signals generated by the pulse generator 101 are referred to as transmission pulse signals. The pulse generator 101 outputs the transmission pulse signals to the TX phase rotator 102 and to the correlator 111 in predetermined cycles. In pulse modulation, predetermined modulation symbols in a constellation on the IQ plane are assigned.

The TX phase rotator 102 applies phase rotation by a predetermined amount to the two transmission pulse signals output from the pulse generator 101 and outputs the resulting transmission pulse signals to the DAC 103. The TX phase rotator 102 typically applies 90° phase rotation to the two transmission pulse signals.

The DAC 103 converts the two transmission pulse signals, which are digital signals, output from the TX phase rotator 102 to an analog signal by using quadrature phase shift keying (QPSK) modulation and outputs the analog signal to the transmission radio unit 104.

The transmission radio unit 104 performs radio processing (such as up-converting or amplification) on the baseband analog signal output from the DAC 103, generates a radar signal, and transmits the radar signal from the antenna 105. The radar signal transmitted from the antenna 105 is reflected by a target and becomes a reflected wave signal. The reflected wave signal is received by the antenna 106.

The reception radio unit 107 performs radio processing (such as down-converting or amplification) on the reflected wave signal received by the antenna 106, generates a baseband analog signal including an I component and a Q component, and outputs the baseband analog signal to the ADC 108.

The ADC 108 converts the analog signal output from the reception radio unit 107 to two digital pulse signals (these pulse signals are hereinafter referred to as reception pulse signals) and outputs the reception pulse signals to the RXIQ error corrector 109.

On the basis of a correction parameter output from the correction parameter calculator 113, the RXIQ error corrector 109 corrects an I component error and a Q component error included in the reception pulse signals output from the ADC 108 and outputs the corrected reception pulse signals to the RX phase rotator 110.

In normal mode, the RX phase rotator 110 applies, to the reception pulse signals output from the RXIQ error corrector 109, phase rotation counter to the phase rotation applied by the TX phase rotator 102 to the transmission pulse signals by the same rotation amount and outputs the resulting reception pulse signals to the correlator 111. In error correction mode, the RX phase rotator 110 does not perform such a phase rotation process but outputs the reception pulse signals output from the RXIQ error corrector 109, to the correlator 111 without any processing. Note that "normal mode" refers to a mode for detecting a target, whereas "error correction mode" refers to a mode for correcting an I component error and a Q component error.

The correlator 111 correlates the reception pulse signals output from the RX phase rotator 110 with the transmission pulse signals output from the pulse generator 101 and outputs the resulting correlation value to the IQ error estimator 112 and the target detector 114.

From the correlation value output from the correlator 111, the IQ error estimator 112 estimates an I component error and a Q component error included in the reception pulse signals and outputs the estimation result to the correction parameter calculator 113.

The correction parameter calculator 113 calculates a correction parameter on the basis of the estimation result for the I component error and the Q component error output from the IQ error estimator 112 and outputs the calculated correction parameter to the RXIQ error corrector 109.

The target detector 114 calculates a coherent integration value by adding correlation values output from the correlator 111 over a predetermined number of transmission cycles and detects the target by using the calculated coherent integration value.

Configuration of RXIQ Error Corrector

An internal configuration of the RXIQ error corrector 109 in the first embodiment of the present disclosure will be described below in detail with reference to FIG. 2.

The RXIQ error corrector 109 includes a multiplier 201, a multiplier 202, a multiplier 203, and an adder 204.

The multiplier 201 multiplies an I component (I) of the reception pulse signals output from the ADC 108, the I component including an error, by a correction parameter $(1+\alpha)$ output from the correction parameter calculator 113, thereby correcting the I component. The multiplier 201 then outputs an I component (I') including no error to the RX phase rotator 110. Here, $\alpha$ is a parameter for correcting an amplitude error between the I component and the Q component.

The multiplier 202 multiplies the I component of the reception pulse signals output from the ADC 108 by a correction parameter $\beta$ output from the correction parameter calculator 113 and outputs the resulting value to the adder 204. Here, $\beta$ is a parameter for correcting a quadrature phase error between the I component and the Q component.

The multiplier 203 multiplies a Q component (Q) of the reception pulse signals output from the ADC 108, the Q component including an error, by a correction parameter $(1-\alpha)$ output from the correction parameter calculator 113 and outputs the resulting value to the adder 204.

The adder 204 adds the multiplied value output from the multiplier 202 to the multiplied value output from the multiplier 203, thereby correcting the Q component. The adder 204 then outputs a Q component (Q') including no error to the RX phase rotator 110.

Method for Correcting I Component Error and Q Component Error

Next, a method for correcting an I component error and a Q component error in this embodiment will be described below in detail with reference to FIG. 3 to FIGS. 6A and 6B.

Figure 3:
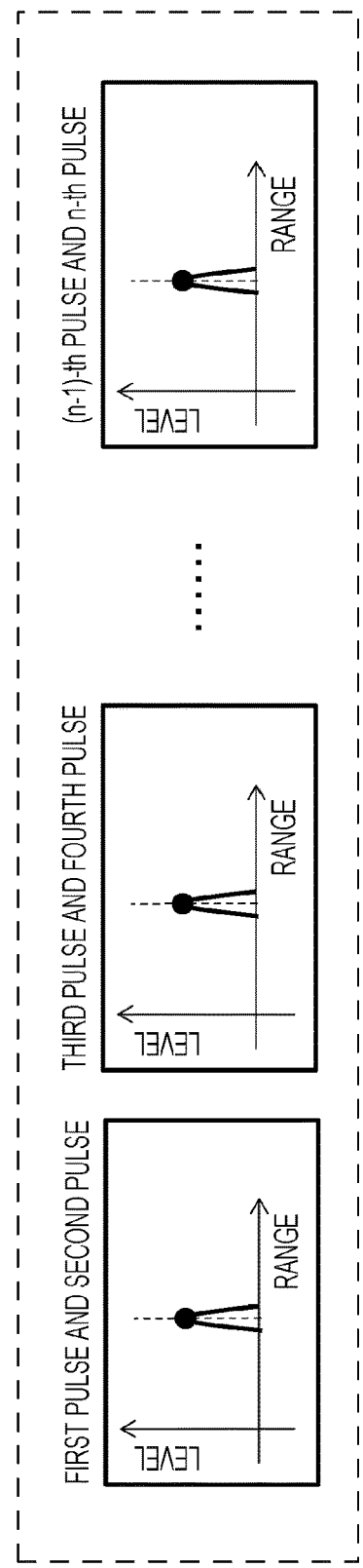
FIG. 3 illustrates a delay profile of reflected wave signals.

FIG. 3 illustrates a delay profile of reflected wave signals. In FIG. 3, each horizontal axis represents a range and each vertical axis represents power of a reflected wave signal.

In FIG. 3, every time two pulse signals are transmitted, a single peak appears. The number of peaks that appear is equal to the number of detected targets. In the radar apparatus 100, a large isolation occurs between the antenna 105 and the antenna 106, and accordingly, the peaks in the delay profile generated by the isolation between the antenna 105 and the antenna 106 are used to correct an I component error and a Q component error. In this embodiment, 90° phase rotation is applied to two pulse signals, so that the phase of the peak appearing in the delay profile is also rotated 90°.

Figure 4:
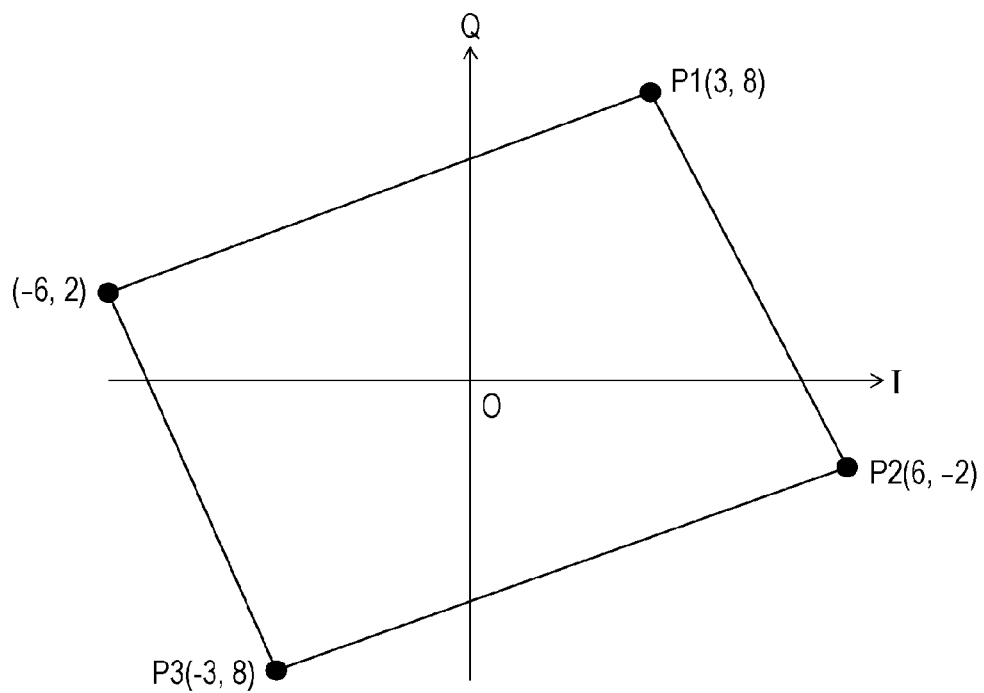
FIG. 4 illustrates examples of I components and Q components of reception pulse signals plotted on an in-phase-quadrature plane (IQ) plane.

FIG. 4 illustrates examples of I and Q components of reception pulse signals plotted on an IQ plane.

If the I and Q components include no error, the figure formed by connecting I and Q component coordinates plotted on the IQ plane has a square shape. If the I and Q components include errors, as illustrated in FIG. 4, the figure formed by connecting I and Q component coordinates plotted on the IQ plane has a shape different from a square (a parallelogram shape). Therefore, by using at least three sets of coordinates of the I and Q components plotted on the IQ plane, the IQ error estimator 112 indexes the magnitudes of the I component error and the Q component error and estimates the I component error and the Q component error.

Specifically, the IQ error estimator 112 calculates two indices from three sets of coordinates of the I and Q components plotted on the IQ plane. It is assumed that P1 represents coordinates of the I and Q components of a first pulse signal and a second pulse signal on the IQ plane, P2 represents coordinates of the I and Q components of a third pulse signal and a fourth pulse signal on the IQ plane, and P3 represents coordinates of the I and Q components of a fifth pulse signal and a sixth pulse signal on the IQ plane. In this case, the IQ error estimator 112 calculates the absolute value of the difference between the distance from the origin O to the coordinates P1 and the distance from the origin O to the coordinates P2 and sets the resulting value as index 1. The IQ error estimator 112 also calculates the absolute value of the difference between the distance from the coordinates P1 to the coordinates P2 and the distance from the coordinates P2 to the coordinates P3 and sets the resulting value as index 2. If the I and Q components include no error, both index 1 and index 2 are 0. The IQ error estimator 112 calculates an index value by adding index 1 to index 2.

The correction parameter calculator 113 can set the correction parameter by using two parameters, which are the parameters $\alpha$ and $\beta$. The correction parameter calculator 113 calculates the above index value by using the parameters $\alpha$ and $\beta$ under the following five conditions.

Condition 1: $(\alpha, \beta)$
Condition 2: $(\alpha+\Delta 1, \beta)$
Condition 3: $(\alpha-\Delta 1, \beta)$
Condition 4: $(\alpha, \beta+\Delta 2)$
Condition 5: $(\alpha, \beta-\Delta 2)$ To obtain the minimum index value, the correction parameter calculator 113 runs an algorithm for updating a condition and iterates such updating of the condition until the minimum index value is obtained. The correction parameter calculator 113 compares index values obtained under the above Conditions 1 to 5 with each other to obtain the minimum index value, and, by using parameters of a condition under which the minimum index value is obtained, outputs a correction parameter to the RXIQ error corrector 109. This can directly decrease the I component error and the Q component error included in the reception pulse signals and can prevent degradation of the performance of detecting Doppler estimation results.

Note that if any of the index values obtained under the above Conditions 1 to 5 is lower than or equal to a threshold, the correction parameter calculator 113 may stop the updating of the condition before completion and may output, to the RXIQ error corrector 109, a correction parameter by using the parameters of the condition under which the index value being lower than or equal to the threshold is obtained. In this case, processing for correcting the I component error and the Q component error can be performed more rapidly.

Figure 5A:
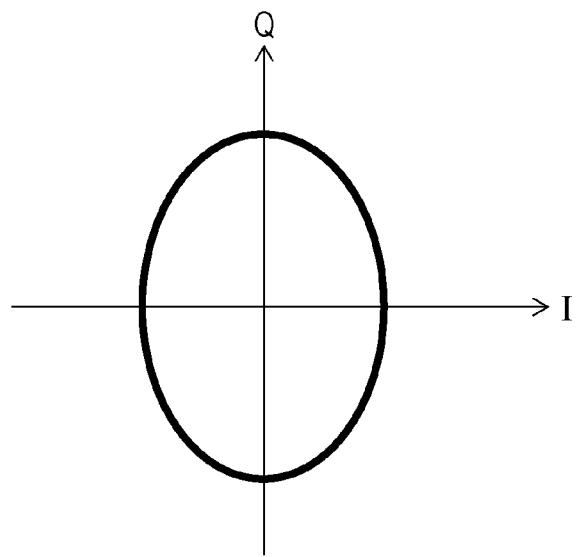
FIG. 5A illustrates a state of an I component and a Q component having an uncorrected amplitude error on an IQ plane of a reception pulse signal.
Figure 5B:
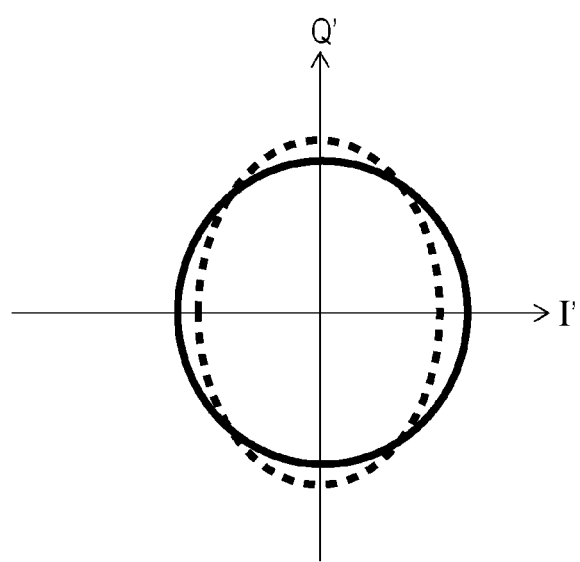
FIG. 5B illustrates a state of the I component and the Q component on the IQ plane of the reception pulse signal after correction of the amplitude error.

In a case in which the I and Q components include an amplitude error as illustrated in FIG. 5A, by using the correction parameter obtained by the correction parameter calculator 113 in the above method, the RXIQ error corrector 109 corrects the I and Q components including the amplitude error and obtains the I and Q components illustrated by the solid line in FIG. 5B in which the amplitude error is cancelled.

Figure 6A:
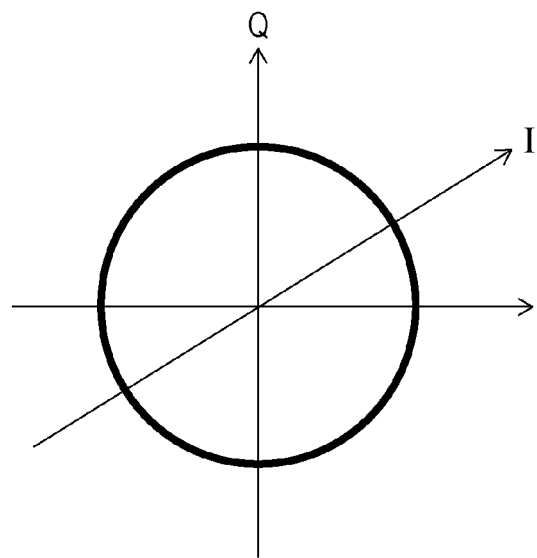
FIG. 6A illustrates a state of an I component and a Q component having an uncorrected phase error on an IQ plane of a reception pulse signal.
Figure 6B:
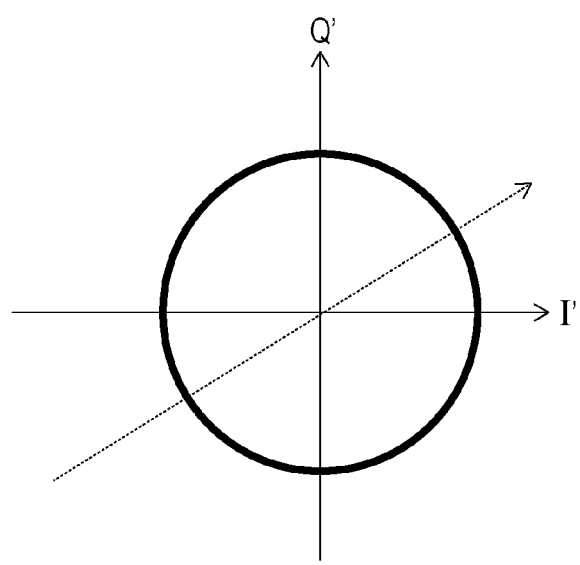
FIG. 6B illustrates a state of the I component and the Q component on the IQ plane of the reception pulse signal after correction of the phase error.

In a case in which the I and Q components include a phase error as illustrated in FIG. 6A, by using the correction parameter obtained by the correction parameter calculator 113 in the above method, the RXIQ error corrector 109 corrects I and Q axes not orthogonal to each other because of the phase error and obtains the I and Q axes that are orthogonal with the I and Q components illustrated in FIG. 6B in which the phase error is cancelled.

Note that the RXIQ error corrector 109 performs both kinds of processing illustrated in FIGS. 5A and 5B and FIGS. 6A and 6B on the I and Q components including both the amplitude error and the phase error.

As described above, the radar apparatus according to this embodiment calculates the correlation value between the reception pulse signals and the transmission pulse signals, estimates, on the basis of the calculated correlation value, an I component error and a Q component error, and corrects the estimated I component error and Q component error included in the reception pulse signals. Thus, it becomes possible to prevent degradation of the sidelobe performance and degradation of the performance of detecting Doppler estimation results. Also, it becomes possible to detect all targets even in a case in which each of frequency domains with inverted signs includes correct frequency components of reflected wave signals reflected by different targets.

Second Embodiment

Configuration of Radar Apparatus

A configuration of a radar apparatus 700 according to a second embodiment of the present disclosure will be described below in detail with reference to FIG. 7.

Figure 7:
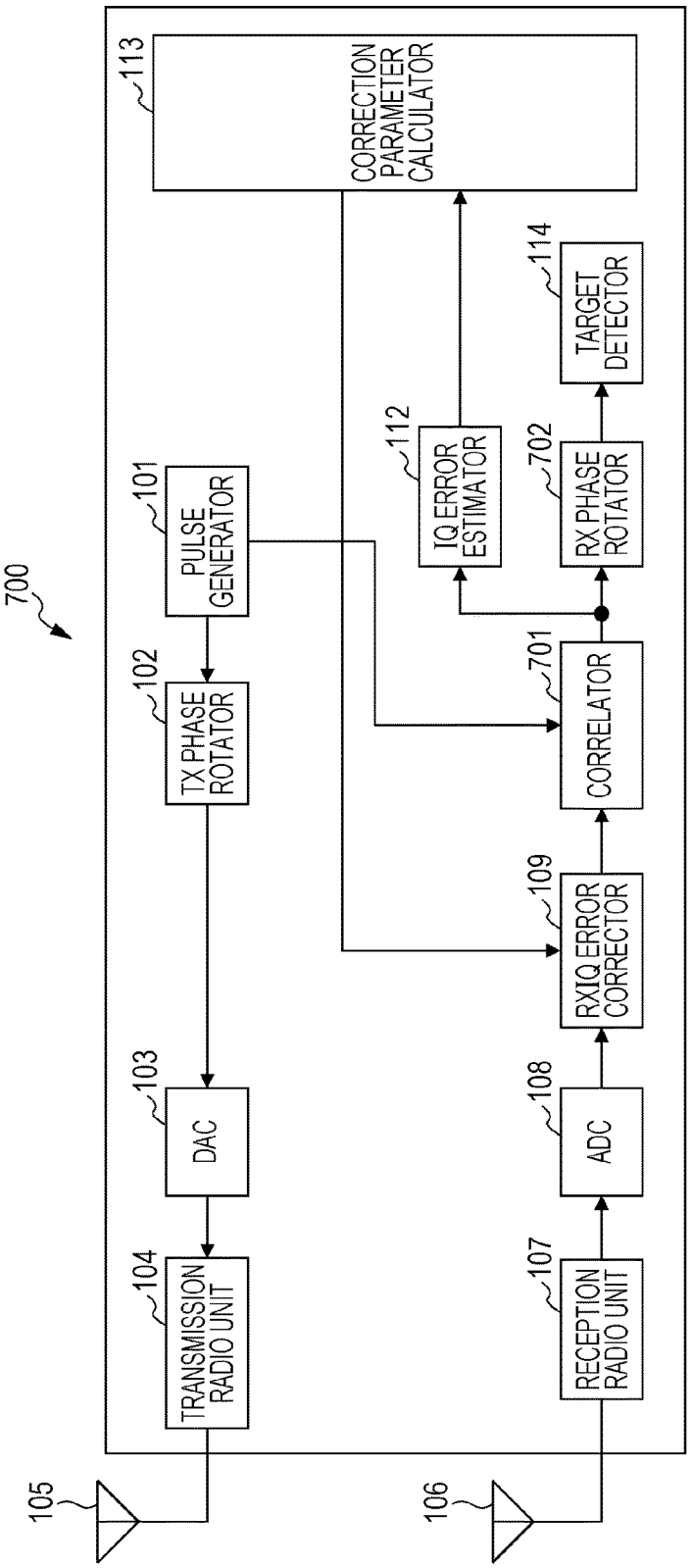
FIG. 7 is a block diagram illustrating a configuration of a radar apparatus according to a second embodiment of the present disclosure.

In the radar apparatus 700 in FIG. 7, substantially the same components as those of the radar apparatus 100 in FIG. 1 are denoted by the same reference numerals, and therefore further description thereof will be omitted.

The radar apparatus 700 in FIG. 7 has a configuration in which, unlike the radar apparatus 100 in FIG. 1, the RX phase rotator 110 and the correlator 111 are removed and a correlator 701 and a reception (RX) phase rotator 702 are added.

On the basis of a correction parameter output from the correction parameter calculator 113, the RXIQ error corrector 109 corrects an I component error and a Q component error included in the reception pulse signals output from the ADC 108 and outputs the reception pulse signals to the correlator 701.

The correlator 701 correlates the reception pulse signals output from the RXIQ error corrector 109 with the transmission pulse signals output from the pulse generator 101 and outputs the resulting correlation value to the IQ error estimator 112 and the RX phase rotator 702.

From the correlation value output from the correlator 701, the IQ error estimator 112 estimates an I component error and a Q component error included in the reception pulse signals and outputs the estimation result to the correction parameter calculator 113.

The RX phase rotator 702 applies, to phase components of the correlation value output from the correlator 701, phase rotation counter to the phase rotation applied by the TX phase rotator 102 to the transmission pulse signals and outputs the resulting correlation value to the target detector 114.

The target detector 114 calculates a coherent integration value by adding correlation values output from the RX phase rotator 702 over a predetermined number of transmission cycles and detects a target by using the calculated coherent integration value.

In this embodiment, the method for correcting the I component error and the Q component error is substantially the same as that in the first embodiment, and therefore further description thereof will be omitted.

In the above manner, according to this embodiment, the effects of the first embodiment can be obtained, and in addition, the operation of correcting the I component error and the Q component error and the operation of detecting the target can be performed concurrently.

Third Embodiment

Configuration of Radar Apparatus

A configuration of a radar apparatus 800 according to a third embodiment of the present disclosure will be described below in detail with reference to FIG. 8.

Figure 8:
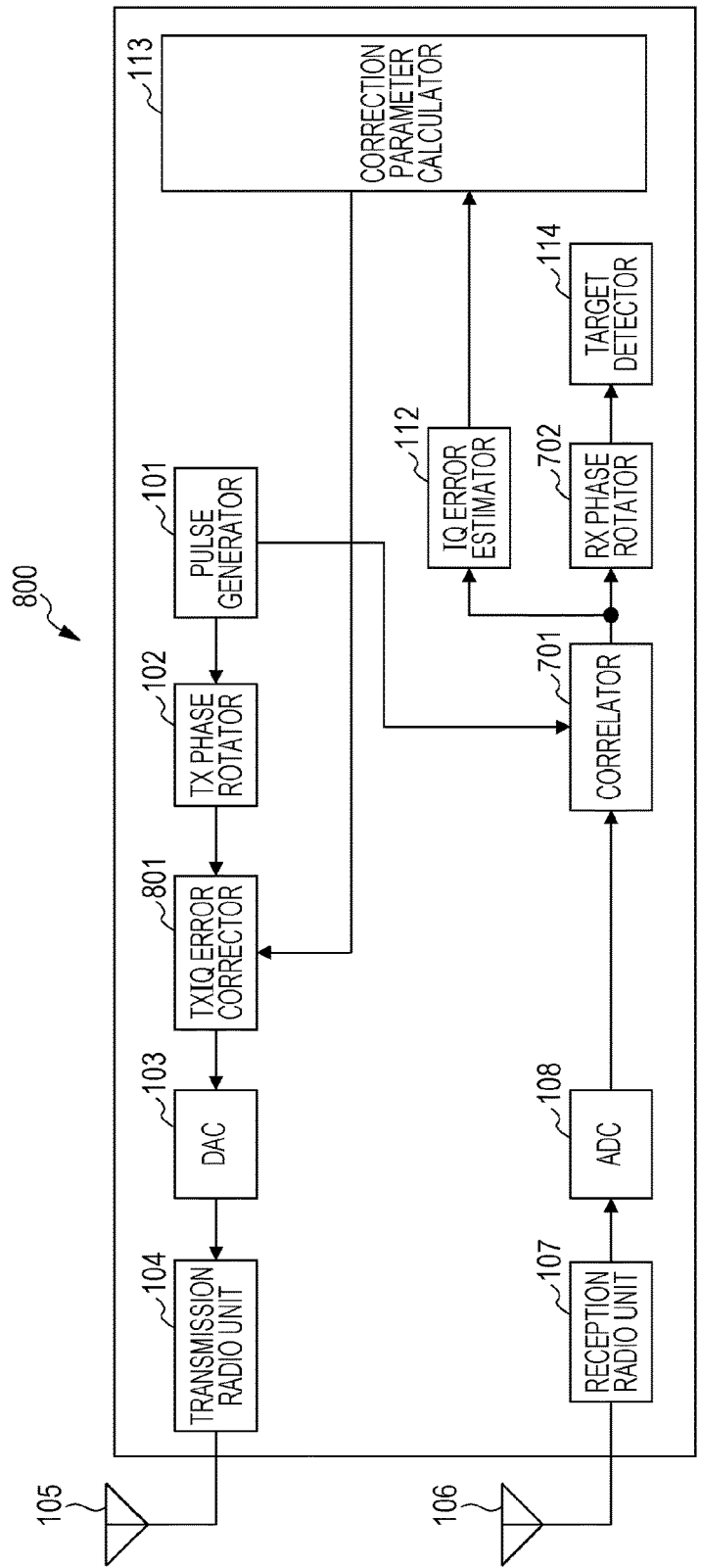
FIG. 8 is a block diagram illustrating a configuration of a radar apparatus according to a third embodiment of the present disclosure.

In the radar apparatus 800 in FIG. 8, substantially the same components as those of the radar apparatus 700 in FIG. 7 are denoted by the same reference numerals, and therefore further description thereof will be omitted.

The radar apparatus 800 in FIG. 8 has a configuration in which, unlike the radar apparatus 700 in FIG. 7, the RXIQ error corrector 109 is removed and a TXIQ error corrector 801 is added.

The TX phase rotator 102 applies phase rotation by a predetermined amount to the transmission pulse signals output from the pulse generator 101 and outputs the resulting transmission pulse signals to the TXIQ error corrector 801.

On the basis of a correction parameter output from the correction parameter calculator 113, the TXIQ error corrector 801 corrects in advance the I and Q components of the transmission pulse signals output from the TX phase rotator 102 in such a manner that an I component error and a Q component error that are estimated to be superimposed in a radio section and included in a reflected wave signal (reception pulse signals) are cancelled out. The TXIQ error corrector 801 then outputs the corrected transmission pulse signals to the DAC 103.

The DAC 103 converts the transmission pulse signals, which are digital signals, output from the TXIQ error corrector 801 to an analog signal and outputs the analog signal to the transmission radio unit 104.

Figure 2:
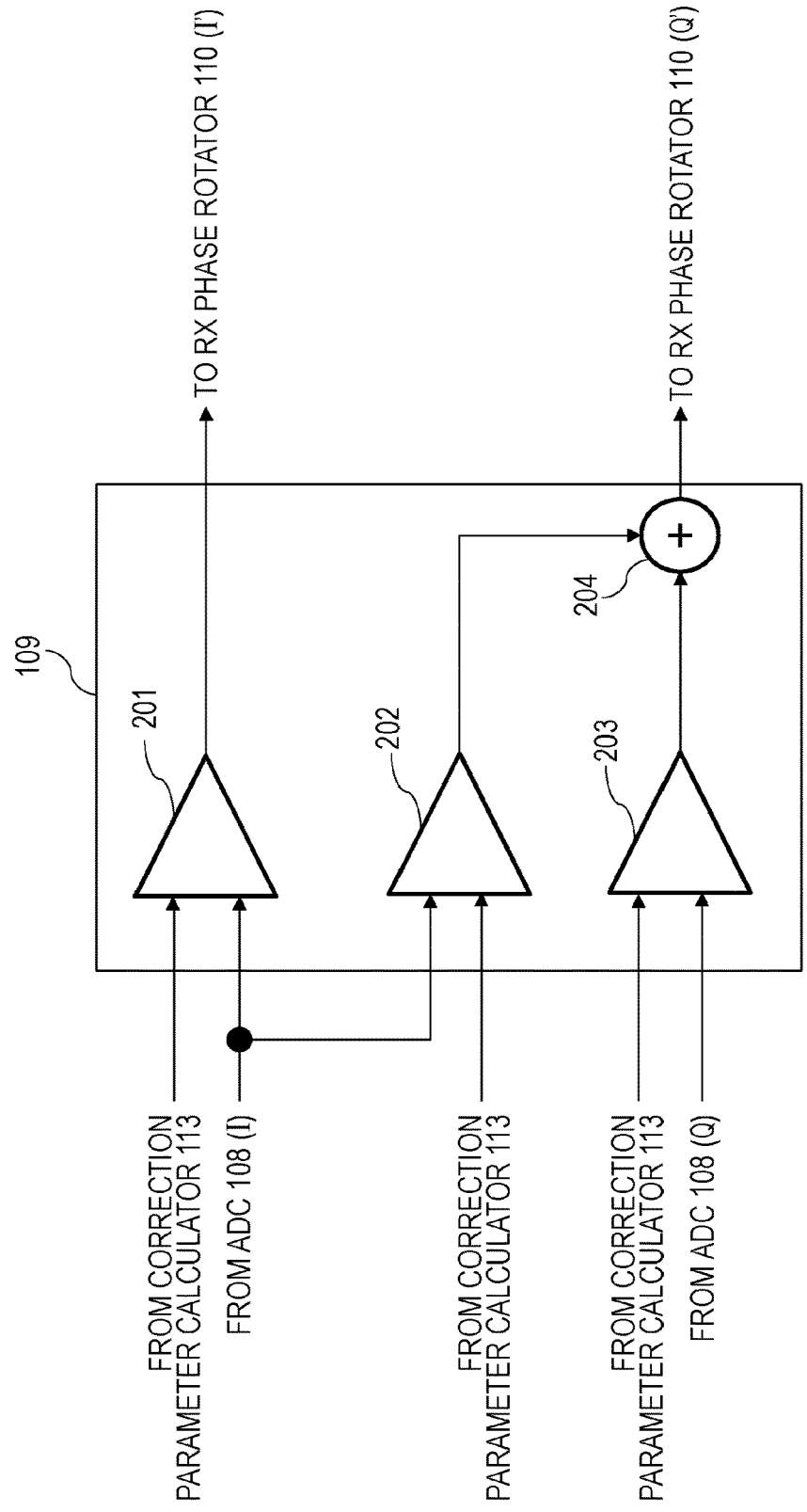
FIG. 2 illustrates an internal configuration of a reception in-phase and quadrature (RXIQ) error corrector in the first embodiment of the present disclosure.

The TXIQ error corrector 801 has substantially the same configuration as that in FIG. 2, and therefore further description thereof will be omitted.

In this embodiment, the method for correcting the I component error and the Q component error is substantially the same as that in the first embodiment, and therefore further description thereof will be omitted.

In the above manner, according to this embodiment, substantially the same effects as those in the second embodiment can be obtained.

Fourth Embodiment

Configuration of Radar Apparatus

A configuration of a radar apparatus 900 according to a fourth embodiment of the present disclosure will be described below in detail with reference to FIG. 9.

Figure 9:
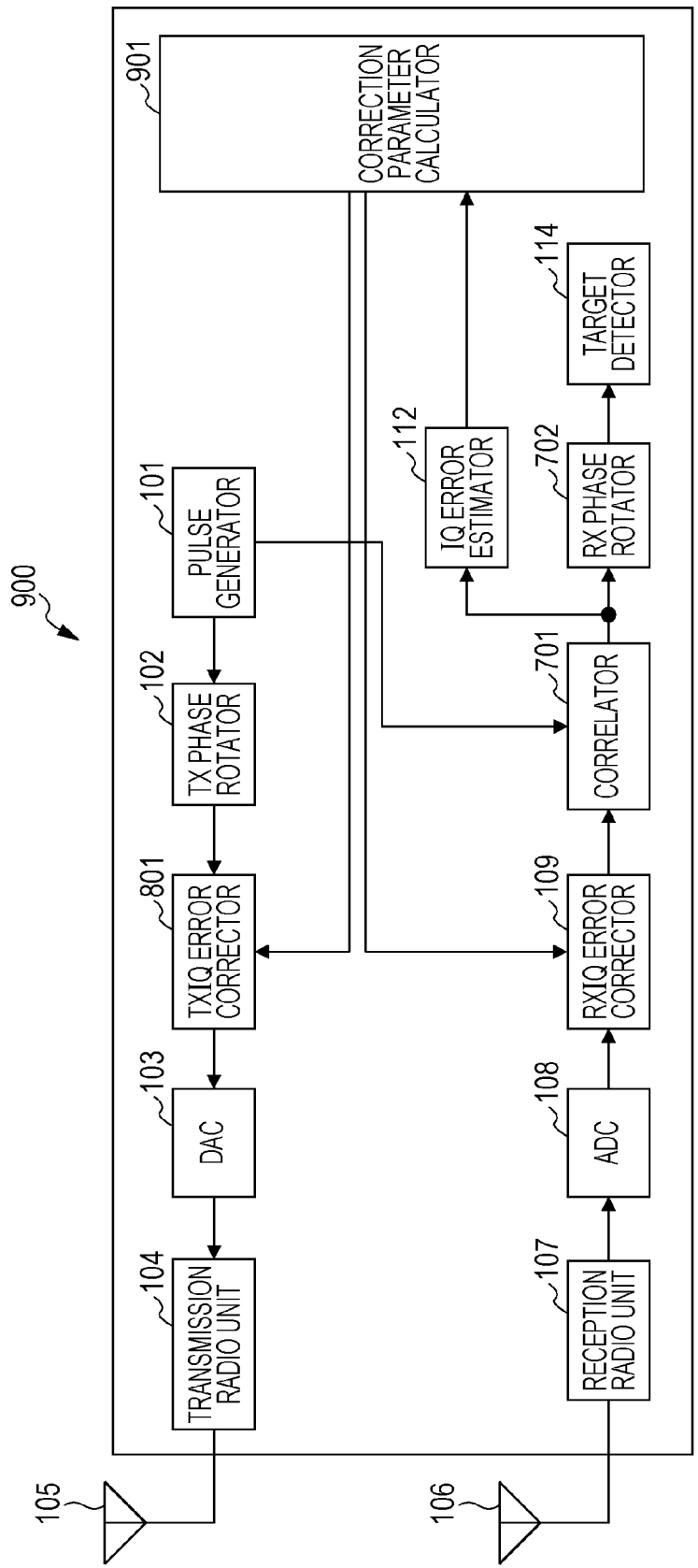
FIG. 9 is a block diagram illustrating a configuration of a radar apparatus according to a fourth embodiment of the present disclosure.

In the radar apparatus 900 in FIG. 9, substantially the same components as those of the radar apparatus 700 in FIG.

7 are denoted by the same reference numerals, and therefore further description thereof will be omitted.

The radar apparatus 900 in FIG. 9 has a configuration in which, unlike the radar apparatus 700 in FIG. 7, the correction parameter calculator 113 is removed and the TXIQ error corrector 801 illustrated in FIG. 8 and a correction parameter calculator 901 are added.

From the correlation value output from the correlator 701, the IQ error estimator 112 estimates an I component error and a Q component error included in the reception pulse signals and outputs the estimation result to the correction parameter calculator 901.

The correction parameter calculator 901 calculates a correction parameter on the basis of the estimation result for the I component error and the Q component error output from the IQ error estimator 112 and outputs the calculated correction parameter to the TXIQ error corrector 801 and the RXIQ error corrector 109.

The TXIQ error corrector 801 and the RXIQ error corrector 109 have substantially the same configuration as those in FIG. 2, and therefore further description thereof will be omitted.

Method for Correcting I Component Error and Q Component Error

Next, a method for correcting an I component error and a Q component error in the fourth embodiment of the present disclosure will be described below in detail with reference to FIG. 10.

Parameters used by the TXIQ error corrector 801 to correct an I component error and a Q component error are set as ($\alpha 1$, $\beta 1$), and parameters used by the RXIQ error corrector 109 to correct the an I component error and a Q component error are set as ($\alpha 2$, $\beta 2$). The correction parameter calculator 901 calculates an optimal solution for the four parameters.

In a case in which the transmission pulse signals include an I component error and a Q component error, the I component error and the Q component error are subjected to phase rotation and then mixed into a reflected wave signal (reception pulse signals). The I and Q component errors (IQerr) generated by the transmission and reception of the pulse signals, are represented by the following expression (1).

$IQ\text{err}=$(error vector of $I$ and $Q$ component errors included in transmission pulse signals)$\cdot \exp(j\Phi)+$ (error vector of $I$ and $Q$ component errors included in reception pulse signals)  (1)

The correction parameter calculator 901 needs to find parameters with which IQerr becomes 0 under all the conditions. Therefore, the correction parameter calculator 901 finds a correction parameter with which (error vector of I and Q component errors included in transmission pulse signals) is equal to 0 and (error vector of I and Q component errors included in reception pulse signals) is equal to 0.

Specifically, the correction parameter calculator 901 sets the phase rotation amount that is added in an isolation as EXP(j$\Phi$) and finds a solution that satisfies the simultaneous equations represented in expression (2) where IQerr becomes 0 in two different isolation paths.

$IQ\text{err}1=$(error vector of $I$ and $Q$ component errors included in transmission pulse signals)$\cdot \exp$
$(j\Phi 1)+$(error vector of $I$ and $Q$ component errors included in reception pulse signals)$=0$ $IQ\text{err}2=$(error vector of $I$ and $Q$ component errors included in transmission pulse signals)$\cdot \exp$
$(j\Phi 2)+$(error vector of $I$ and $Q$ component errors included in reception pulse signals)$=0$  (2)

Figure 10:
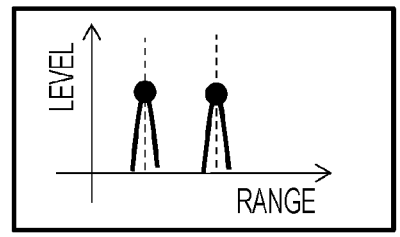
FIG. 10 illustrates a delay profile of a reflected wave signal in the fourth embodiment of the present disclosure.

Therefore, focusing on phases of two peaks of the different isolation paths in the delay profile illustrated in FIG. 10 and assuming that an index with respect to an isolation path 1 is EST 1 and an index with respect to an isolation path 2 is EST 2, the correction parameter calculator 901 calculates EST 1 and EST 2 under the following nine conditions.

Condition 1: ($\alpha 1$, $\beta 1$, $\alpha 2$, $\beta 2$)
Condition 2: ($\alpha 1+\Delta 1$, $\beta 1$, $\alpha 2$, $\beta 2$)
Condition 3: ($\alpha 1-\Delta 1$, $\beta 1$, $\alpha 2$, $\beta 2$)
Condition 4: ($\alpha 1$, $\beta 1+\Delta 2$, $\alpha 2$, $\beta 2$)
Condition 5: ($\alpha 1$, $\beta 1-\Delta 2$, $\alpha 2$, $\beta 2$)
Condition 6: ($\alpha 1$, $\beta 1$, $\alpha 2+\Delta 3$, $\beta 2$)
Condition 7: ($\alpha 1$, $\beta 1$, $\alpha 2-\Delta 3$, $\beta 2$)
Condition 8: ($\alpha 1$, $\beta 1$, $\alpha 2$, $\beta 2+\Delta 4$)
Condition 9: ($\alpha 1$, $\beta 1$, $\alpha 2$, $\beta 2-\Delta 4$)

The correction parameter calculator 901 iterates updating of a condition among the nine conditions until the value of EST 1+EST 2 becomes the minimum. The correction parameter calculator 901 also outputs, to the TXIQ error corrector 801 and the RXIQ error corrector 109, a correction parameter that is set by using the parameters of the condition under which the value of EST 1+EST 2 is the minimum.

The correction parameter is obtained by using two isolation paths in the above example; however, the correction parameter may be obtained by using a peak of a correlation value with respect to a static target.

In the above manner, according to this embodiment, an I component error and a Q component error included in the transmission pulse signals and an I component error and a Q component error included in the reception pulse signals are corrected. Therefore, it is possible to prevent degradation of the sidelobe performance and degradation of the performance of detecting Doppler estimation results with higher accuracy than in the first to third embodiments. In addition, even in a case in which each of frequency domains with inverted signs includes correct frequency components of reflected wave signals reflected by different targets, all targets can be detected.

Fifth Embodiment

A fifth embodiment of the present disclosure illustrates a variation of the internal configuration of the RXIQ error corrector 109. Note that a radar apparatus according to this embodiment has substantially the same configuration as that in FIG. 1, and therefore further description thereof will be omitted.

Configuration of RXIQ Error Corrector

The internal configuration of the RXIQ error corrector 109 in this embodiment will be described below in detail with reference to FIG. 11.

The RXIQ error corrector 109 includes a multiplier 1001, a multiplier 1002, and an adder 1003.

The multiplier 1001 multiplies an I component (I) of the reception pulse signals output from the ADC 108, the I component including an error, by a correction parameter (1+$\alpha$) output from the correction parameter calculator 113, thereby correcting the I component. The multiplier 1001 then outputs an I component (I') including no error to the RX phase rotator 110.

The multiplier 1002 multiplies the I component of the reception pulse signals output from the ADC 108 by a correction parameter $\beta$ output from the correction parameter calculator 113 and outputs the resulting value to the adder 1003.

The adder 1003 adds a Q component (Q) of the reception pulse signals output from the ADC 108, the Q component including an error, to the multiplied value output from the multiplier 1002, thereby correcting the Q component. The adder 1003 then outputs a Q component (Q') including no error to the RX phase rotator 110.

Figure 11:
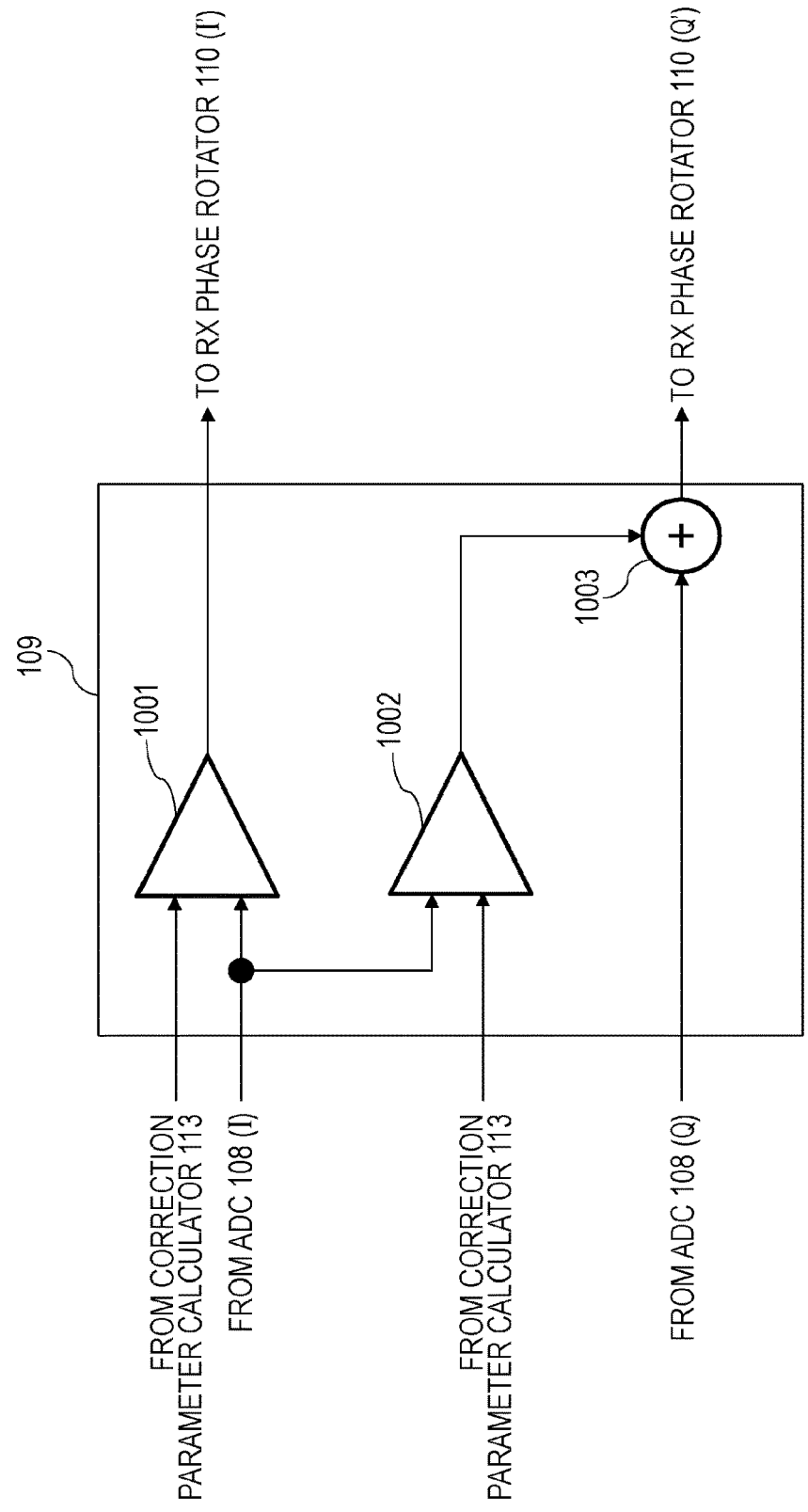
FIG. 11 illustrates an internal configuration of an RXIQ error corrector in a fifth embodiment of the present disclosure.

Note that an internal configuration of the TXIQ error corrector 801 in this embodiment may be the configuration illustrated in FIG. 11.

Sixth Embodiment

A sixth embodiment of the present disclosure illustrates a variation of the internal configuration of the RXIQ error corrector 109. Note that a radar apparatus according to this embodiment has substantially the same configuration as that in FIG. 1, and therefore further description thereof will be omitted.

Configuration of RXIQ Error Corrector

The configuration of the RXIQ error corrector 109 in this embodiment will be described below in detail with reference to FIG. 12.

The RXIQ error corrector 109 includes a multiplier 1101, a multiplier 1102, a multiplier 1103, a multiplier 1104, an adder 1105, and an adder 1106.

The multiplier 1101 multiplies an I component (I) of the reception pulse signals output from the ADC 108, the I component including an error, by a correction parameter $(1+\alpha)$ output from the correction parameter calculator 113 and outputs the resulting value to the adder 1105.

The multiplier 1102 multiplies the I component (I) of the reception pulse signals output from the ADC 108, the I component including an error, by a correction parameter $\beta$ output from the correction parameter calculator 113 and outputs the resulting value to the adder 1106.

The multiplier 1103 multiplies a Q component (Q) of the reception pulse signals output from the ADC 108, the Q component including an error, by a correction parameter $\gamma$ output from the correction parameter calculator 113 and outputs the resulting value to the adder 1105.

The multiplier 1104 multiplies the Q component (Q) of the reception pulse signals output from the ADC 108, the Q component including an error, by a correction parameter $(1-\alpha)$ output from the correction parameter calculator 113 and outputs the resulting value to the adder 1106.

The adder 1105 adds the multiplied value output from the multiplier 1101 to the multiplied value output from the multiplier 1103, thereby correcting the I component. The adder 1105 then outputs an I component (I') including no error to the RX phase rotator 110.

The adder 1106 adds the multiplied value output from the multiplier 1102 to the multiplied value output from the multiplier 1104, thereby correcting the Q component. The adder 1106 then outputs a Q component (Q') including no error to the RX phase rotator 110.

Figure 12:
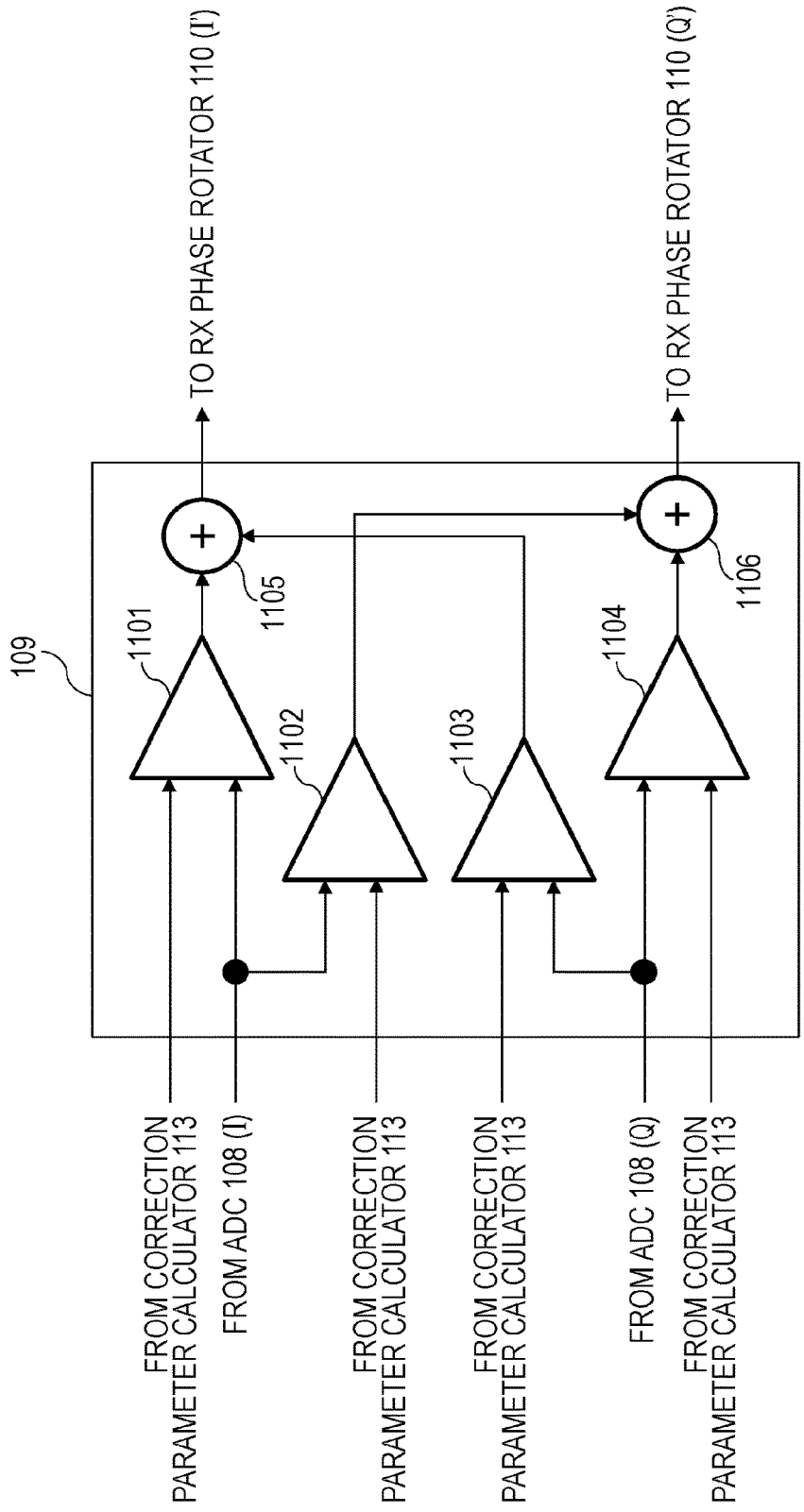
FIG. 12 illustrates an internal configuration of an RXIQ error corrector in a sixth embodiment of the present disclosure.

Note that an internal configuration of the TXIQ error corrector 801 in this embodiment may be the configuration illustrated in FIG. 12.

The present disclosure is not limited to the above embodiments in terms of the type, arrangement, number, or the like of the members. It is needless to say that the present disclosure can be modified as appropriate without departing from the spirit of the present disclosure as long as the components have substantially the same effects as those in the above embodiments.

Specifically, although the first to sixth embodiments run the algorithm of calculating the minimum index value and updating the setting value, a table in which index values and correction parameters are associated with each other may be stored in advance and the correction parameter associated with the calculated index value may be selected.

Aspects of embodiments of the present disclosure may be configured as follows.

A radar apparatus according to a first aspect of the present disclosure includes a pulse generator which, in operation, sequentially generates, in each transmission cycle, a digital transmission pulse signal including an in-phase (I) component and a quadrature (Q) component;

a phase rotator which, in operation, sequentially applies, in each transmission cycle, a first phase rotation to the digital transmission pulse signal;

a digital-to-analog converter (DAC) which, in operation, converts the digital transmission pulse signal, to which the first phase rotation is applied, to a transmission baseband analog signal;

a transmitter which, in operation, converts the transmission baseband analog signal to a radar signal on a radio frequency and transmits the radar signal;

a receiver which, in operation, receives a reflected wave signal resulting from the radar signal being reflected on an object and converts the reflected wave signal to a reception baseband analog signal;

an analog-to-digital converter (ADC) which, in operation, converts the reception baseband analog signal to a digital reception pulse signals including an in-phase (I) component and a quadrature (Q) component;

a correlator which, in operation, calculates a correlation value between the digital transmission pulse signals and the digital reception pulse signals;

an error estimator which, in operation, estimates, on the basis of the correlation value, an I component error and a Q component error included in the digital reception pulse signals;

a correction parameter calculator which, in operation, calculates a correction parameter for correcting the I component error and the Q component error; and an error corrector which, in operation, corrects, on the basis of the correction parameter, the I component error and the Q component error included in at least one of the digital transmission pulse signals and the digital reception pulse signals.

A radar apparatus according to a second aspect of the present disclosure is the radar apparatus according to the first aspect of the present disclosure further including a reception phase rotator which, in operation, applies a second phase rotation to one of the digital reception pulse signals outputting from the ADC and the correlation value outputting from the correlator, the second phase rotation being a reverse phase rotation of the first phase rotation.

A signal generating apparatus according to a third aspect of the present disclosure includes a pulse generator which, in operation, sequentially generates, in each transmission cycle, a digital transmission pulse signal including an in-phase (I) component and a quadrature (Q) component; a phase rotator which, in operation, sequentially applies, in each transmission cycle, a first phase rotation to the digital transmission pulse signal; an outputter which, in operation, outputs the digital transmission pulse signals, to which the first phase rotation is applied, to a transmitter; an inputter which, in operation, inputs a reflected wave signal reflected by an object and received by a receiver as digital reception pulse signals; a correlator which, in operation, calculates a correlation value between the digital transmission pulse signals and the digital reception pulse signals; an error estimator which, in operation, estimates, on the basis of the correlation value, an I component error and a Q component error included in the digital reception pulse signals; a correction parameter calculator which, in operation, calculates a correction parameter for correcting the I component error and the Q component error; and an error corrector which, in operation, corrects, on the basis of the correction parameter, the I component error and the Q component error of at least one of the digital transmission pulse signals and the digital reception pulse signals.

A signal generating apparatus according to a fourth aspect of the present disclosure is the signal generating apparatus according to the third aspect of the present disclosure further including a reception phase rotator which, in operation, applies a second phase rotation to one of the digital reception pulse signals outputting from the ADC and the correlation value outputting from the correlator, the second phase rotation being a reverse phase rotation of the first phase rotation.

A signal generating apparatus according to a fifth aspect of the present disclosure is the signal generating apparatus according to the third aspect of the present disclosure in which the outputter converts the digital transmission pulse signals, to which the first phase rotation is applied, to a transmission baseband analog signal and outputs the transmission baseband analog signal to the transmitter.

A signal generating apparatus according to a sixth aspect of the present disclosure is the signal generating apparatus according to the third aspect of the present disclosure in which the inputter converts the reflected wave signal to the digital reception pulse signals.

The embodiments have been described above with reference to the accompanying drawings; however, it is needless to say that the present disclosure is not limited to the above examples. A person having ordinary skill in the art could obviously conceive various changes or modifications within the scope of the claims, and it should be considered that those changes or modifications fall within the technical scope of the present disclosure. The components described in the above embodiments may be combined as desired without departing from the spirit of the present disclosure.

The embodiments of the present disclosure have illustrated examples using hardware; however, it is possible to implement the present disclosure by using software in association with hardware.

Function blocks employed in the description of each of the above embodiments may typically be implemented as a large-scale integration (LSI), which is an integrated circuit including an input terminal and an output terminal. These may be formed as individual chips or partially or totally contained on a single chip. An "LSI" is mentioned here but may also be referred to as "integrated circuit (IC)," "system LSI," "super LSI," or "ultra LSI" depending on the extent of integration.

Further, the method of circuit integration is not limited to LSIs, and implementation using dedicated circuitry or general purpose processors is also possible. It is possible to use a field programmable gate array (FPGA) in which programming is possible after LSI manufacture or to use a reconfigurable processor in which connections and settings of circuit cells within an LSI can be reconfigured.

Further, if an integrated circuit technology emerges to replace LSIs as a result of the advancement of a semiconductor technology or a derivative technology, it is naturally also possible to carry out function block integration using this technology. Application of biotechnology is also possible.

The radar apparatus according to one or more embodiments of the present disclosure is preferably used to detect a target.

What is claimed is:

1. A radar apparatus comprising:
   a pulse generator which, in operation, sequentially generates, in transmission cycles, digital transmission pulse signals including an in-phase (I) component and a quadrature (Q) component;
   a phase rotator which, in operation, sequentially applies, in the transmission cycles, a first phase rotation to the digital transmission pulse signals;
   a digital-to-analog converter (DAC) which, in operation, converts the digital transmission pulse signals, to which the first phase rotation is applied, to a transmission baseband analog signal;
   a transmitter which, in operation, converts the transmission baseband analog signal to a radar signal on a radio frequency and transmits the radar signal;
   a receiver which, in operation, receives a reflected wave signal resulting from the radar signal being reflected on an object and converts the reflected wave signal to a reception baseband analog signal;
   an analog-to-digital converter (ADC) which, in operation, converts the reception baseband analog signal to digital reception pulse signals including an in-phase (I) component and a quadrature (Q) component;
   a correlator which, in operation, calculates a correlation value between the digital transmission pulse signals and the digital reception pulse signals;
   an error estimator which, in operation, estimates, on the basis of the correlation value, an I component error and a Q component error included in the digital reception pulse signals;
   a correction parameter calculator which, in operation, calculates a correction parameter for correcting the I component error and the Q component error; and
   an error corrector which, in operation, corrects, on the basis of the correction parameter, the I component and the Q component included in at least one of the digital transmission pulse signals and the digital reception pulse signals.

2. The radar apparatus according to claim 1, further comprising:
   a reception phase rotator which, in operation, applies a second phase rotation to one of the digital reception pulse signals outputting from the ADC and the correlation value outputting from the correlator, the second phase rotation being a reverse phase rotation of the first phase rotation.

3. A signal generating apparatus comprising:
   a pulse generator which, in operation, sequentially generates, in transmission cycles, digital transmission pulse signals including an in-phase (I) component and a quadrature (Q) component;
   a phase rotator which, in operation, sequentially applies, in the transmission cycles, a first phase rotation to the digital transmission pulse signals;
   a digital-to-analog converter (DAC) which, in operation, converts the digital transmission pulse signals, to which the first phase rotation is applied, to a transmission baseband analog signal and outputs the transmission baseband analog signal to a transmitter;

an analog-to-digital converter (ADC) which, in operation, inputs a reflected wave signal reflected by an object and received by a receiver as digital reception pulse signals;

a correlator which, in operation, calculates a correlation value between the digital transmission pulse signals and the digital reception pulse signals;

an error estimator which, in operation, estimates, on the basis of the correlation value, an I component error and a Q component error included in the digital reception pulse signals;

a correction parameter calculator which, in operation, calculates a correction parameter for correcting the I component error and the Q component error; and an error corrector which, in operation, corrects, on the basis of the correction parameter, the I component and the Q component of at least one of the digital transmission pulse signals and the digital reception pulse signals.

4. The signal generating apparatus according to claim 3, further comprising:

a reception phase rotator which, in operation, applies a second phase rotation to one of the digital reception pulse signals outputting from the ADC and the correlation value outputting from the correlator, the second phase rotation being a reverse phase rotation of the first phase rotation.

5. The signal generating apparatus according to claim 3, wherein the ADC converts the reflected wave signal to the digital reception pulse signals.

* * * * *